United States Patent [19]

Frankel

[11] Patent Number: 4,856,744
[45] Date of Patent: Aug. 15, 1989

[54] HANDLE SUPPORT ASSEMBLY

[76] Inventor: Gail Frankel, 5710 Glen Heather Dr., Dallas, Tex. 75252

[21] Appl. No.: 201,480

[22] Filed: Jun. 1, 1988

[51] Int. Cl.$^4$ ............................................. E04G 3/00
[52] U.S. Cl. ..................................... 248/215; 211/74; 211/88; 211/113; 248/227; 248/301; 248/304; 248/311.2
[58] Field of Search ............ 248/215, 227, 230, 231.8, 248/301, 304, 305, 311.2, 313, 339, 340; 211/74, 88, 113

[56] References Cited

U.S. PATENT DOCUMENTS

| D. 228,335 | 9/1973  | Jackson ........................ 248/311.2 X |
|------------|---------|---------------------------------------------|
| 1,069,160  | 8/1913  | Meltz .................................... 248/230 |
| 2,437,331  | 3/1948  | Murray et al. .................. 248/227 X |
| 2,461,071  | 2/1949  | Mettenleiter ........................ 248/227 |
| 2,506,119  | 5/1950  | Tregear .............................. 248/228 |
| 3,603,549  | 9/1971  | Brilando et al. ................ 248/313 X |
| 3,904,041  | 9/1975  | Medgebow ...................... 248/215 X |
| 4,203,175  | 5/1980  | Heine .............................. 248/215 X |
| 4,410,115  | 10/1983 | McClain, Jr. et al. ......... 248/215 X |
| 4,436,232  | 3/1984  | Zane et al. .................... 248/311.2 X |

FOREIGN PATENT DOCUMENTS

0001236 of 1892 United Kingdom ................ 248/215

Primary Examiner—Ramon O. Ramirez
Attorney, Agent, or Firm—Johnson & Gibbs

[57] ABSTRACT

A support assembly for utilization with handles on strollers and the like for securement of articles thereto. The support assembly includes both a unit which is integrally formed with a handle and a discrete assembly for attachment to handles. The assembly is preferably of integrally molded plastic that comprises at least first and second hook portions adapted for supporting articles such as packages, clothes and purses from strollers, carts and the like. The assembly may also include a beverage container region adapted for the retention of a canned drink, baby bottle or the like. The assembly provides a myriad of hook configurations and demountable attachment sections for the securement of loose articles such as purses, sweaters, towels or other infant items. In this manner, strollers, bicycles and the like may be rendered safer and more convenient for the user who must handle loose articles.

10 Claims, 6 Drawing Sheets

HANDLE SUPPORT ASSEMBLY

BACKGROUND OF THE INVENTION

1. Field of the Invention

The present invention pertains to handle support fixtures and, more particularly, to an article support assembly adapted for integral formation with or demountable attachment to handles of strollers, carts, bicycles and the like.

2. History of the Prior Art

The prior art is replete with portable article carrying units. These units have been designed and constructed for support of a myriad of items and for a plurality of applications. The items include beverages, books, newspapers and small personal items. Their applications include securement to bicycle handle bars, grocery baskets, crutches and similar devices adapted for facilitating ambulatory motion with the conveyance of associated articles. It is not uncommon for such assemblies to have designs adapted specifically for the primary article support application. For example, shopping basket support assemblies have included configured plate assemblies adapted for inter-engaging the orthogonal frame basket members in a fashion facilitating stability of the configured plate. Such a plate has been constructed for supporting beverage containers as shown in U.S. Pat. No. 2,633,278. It may be seen in this 1953 patent that the overall configuration affording said stability and ease in assembly in unique to this particular application.

Numerous other attachment devices have been the subject of innovation in the prior art. For example U.S. Pat. No. 1,134,577 illustrates a bicycle handle bar connection assembly affording support for a basket. Although this is a somewhat antiquated design (1915), it illustrates the importance of freedom of the user's hands relative to handle bars and the like. More recent developments include handle assemblies for more conventional ambulatory assistance structures. Wheelchairs for example are designed to assist the physically impaired and therefore convenience assemblies mounted to the wheelchair obviously facilitate both the wheelchair operator and/or those persons assisting the wheelchair operator. Such assemblies include beverage container supports and clipboard mountings to allow the wheelchair occupant immediate access to the article supported thereby. Indeed, it is the ability to afford the occupant, or controller of the particular vehicle for which the handle bar is associated, ease in access that comprises the most important utilitarian function of the mounting. The method and apparatus of attachment have thus been therein the subject of individual design and engineering considerations. Many of these designs and considerations have been deemed novel throughout the previous decades for a plurality of vehicle and/or frame structures generally associated with ambulatory motion.

Structures associated with ambulatory motion include not only wheelchairs but also bicycles, crutches, shopping carts, and infant strollers. These articles generally require attention by the operator or, in the case of wheelchairs and crutches, by the patient. In these instances, the hands of the patient are generally fully occupied in controlling the wheelchair or the crutch. Even so, access to objects such as drinking containers or related support articles is necessary for the convenience and comfort of the user. Relative to handle bars for bicycles, strollers, shopping carts and the like, it is often necessary for the user to manually steer the particular wheeled structure. It is clearly an encumbrance for the user to also deal with loose articles such as purses, sweaters, drinks, or infant care articles while handling a stroller or cart. Many prior art innovations have thus addressed these various utilitarian needs by the provision of mechanical assemblies adapted for mounting to handle bar areas for particular structures and applications. U.S. Pat. No. 4,071,175 teaches a beverage container holder for a handle bar which permits its attachment in a convenient location and orientation. The same holds true for U.S. Pat. Nos. 4,312,465 and 4,570,835 which teach related beverage container holder supports facilitating user operation. These references manifest the advantages and need for such innovations.

A distinct area of need in handle bar support structures adapted for facilitating the convenience of the user is not only a beverage container support but means for easily supporting the loose articles described above. In the case of shopping carts and baby strollers, it is common for the operator to carry loose sweaters, purses, shopping bags and/or infant care bags. Without proper securement of these articles relative to the shopping cart or stroller, both inconvenience and danger can result due to lack of attention by the operator in the event that the articles become loose, dislodged and/or generally unsecured. It would be a distinct advance over the prior art to provide a support assembly specifically adapted for handle bar regions for strollers, carts and the like facilitating the support of the aforesaid articles in a safe, convenient and economical fashion. The method and apparatus of the present invention provide such an assembly in an integrally formed article support adapted for securement to, or integration with, handle bars and the like.

SUMMARY OF THE INVENTION

The present invention relates to handle bar support accessories for the securement of collateral articles. More particularly, one aspect of the present invention comprises a handle bar support assembly integrally formed with a plurality of hook shaped elements adapted for the securement and support of articles therefrom relative to the handle bar upon which the assembly is attached.

In another aspect, the invention includes a support assembly for use with a handle on a stroller or the like comprising an integrally formed body portion and handle engaging means integral with and extending generally upwardly from the body portion. The handle has means adapted to engage a generally horizontal portion of a stroller handle. Hook means integral with and extending generally downwardly from the body portion are available for selective hooking engagement with articles to be supported by the assembly. The handle engaging means may be integrally connected to said handle or include threaded fastener means for connection to the handle In the latter case, the handle engaging means comprises gripping means frictionally engagable with the handle.

Also yet another aspect, the invention includes a support assembly for use with a handle on a stroller or the like comprising an integrally formed body portion and handle engaging means integral with and extending generally upwardly from the body portion with means adapted to engage a generally horizontal portion of a stroller handle or the like. Hook means integral with and extending generally downwardly from the body portion provide selective hooking engagement with an article to be supported by the assembly. The hook means comprise at least a pair of hooks in one embodiment and a clamp hook in another. Likewise, the hook means are positioned directly between the handle engaging means in one embodiment and in a laterally offset position from the handle engaging means in another. The hooks may face in opposite directions or the same direction. Moreover, a beverage container holding means may extend generally laterally from the body portion. The beverage container holding means may comprise a generally upright wall means for at least partially surrounding a beverage container and the wall means can define compartments for a plurality of beverage containers.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figures 1, 2:
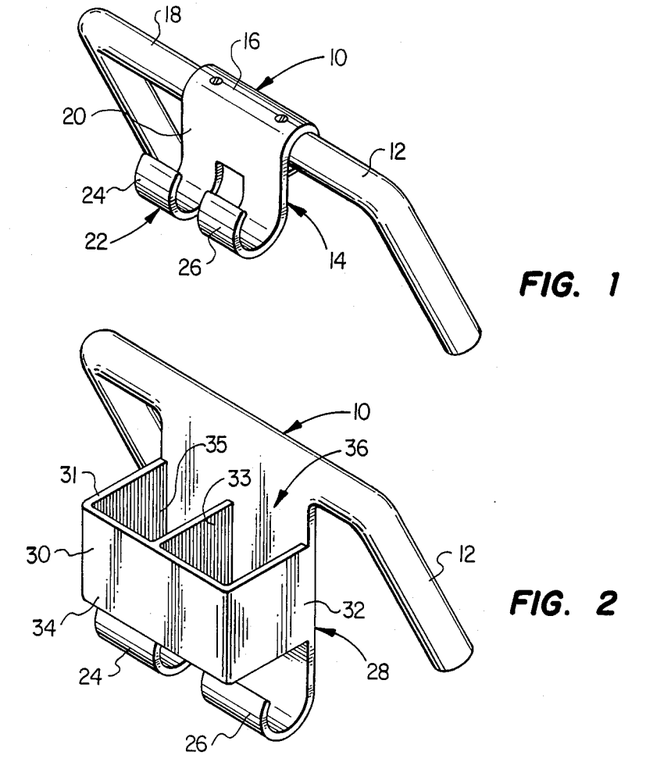
FIG. 1 is a fragmentary perspective view of one embodiment of the article support apparatus of the present invention.
FIG. 2 is a fragmentary perspective view of an alternative embodiment of the article support apparatus of FIG. 1.

Referring first to FIG. 1, there is shown a perspective view of a support hook assembly 10 integrally formed in a handle 12. Handle 12 may be of the type utilized for strollers, buggies, bicycles, carts, and other conventional ambulatory assistance devices. The support assembly 10 comprises a body portion 14 having an upper handle engagement region 16 integrally formed with the handle body 18. An intermediate body portion 20 is constructed of a substantially planer configuration transisting region 20 and transisting into the lower hook region 22 comprising a first hook section 24 and a second hook section 26. Each of the hook sections 24 and 26 are formed in a curvilinear configuration adapted for facilitating the attachment of a handle of a purse, a sweater or the like. As shown herein the hook assembly 10 is adapted for facilitating such ease and attachment. This integral configuration of the hook attachment assembly 10 and handle 12 is but one embodiment of the present invention.

Referring now to FIG. 2 there is shown an integral construction of an alternative embodiment of a hook assembly 10 incorporating a beverage container holder. The body portion 28 of the hook assembly 10 comprises a compartment 30 adapted for receiving and securing first and second beverage containers. The compartment 30 is constructed of substantially planer sidewalls 31 and 32 with an intermediate wall 33 disposed therebetween and frontal wall 34 therein defining a first beverage container holding sections 35 and a second beverage container holding section 36. Beneath the beverage container holding sections 35 and 36 are disposed the hook sections 24 and 26 of the type shown in FIG. 1. In this particular embodiment the handle 12 may be utilized with a stroller for facilitating both the attachment of purses and loose articles as well as containing beverages during the use of the stroller for which handle 12 is attached.

Figures 3, 4:
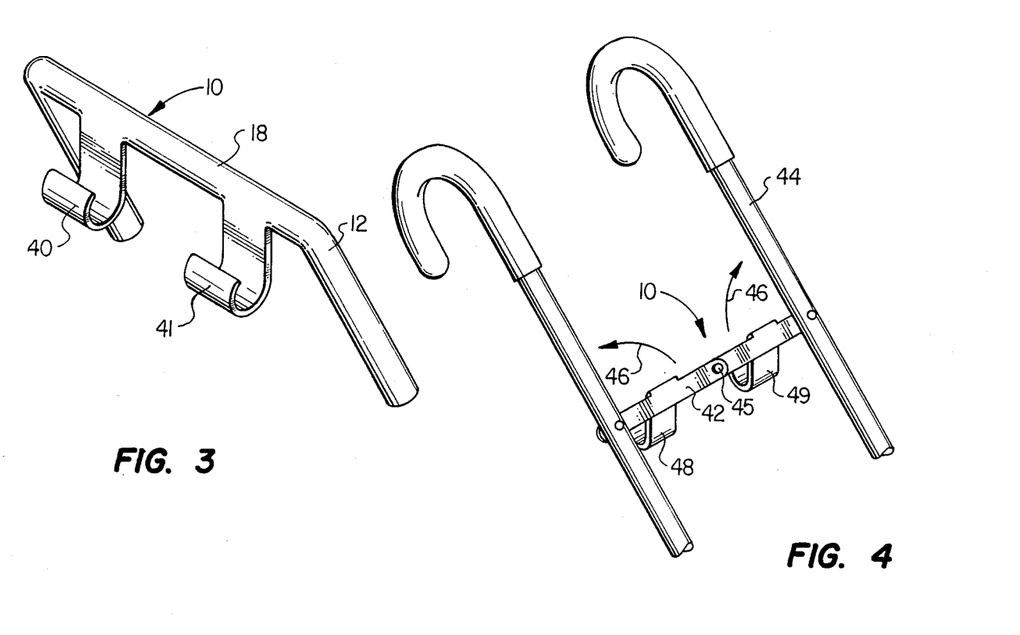
FIG. 3 is a fragmentary perspective view of an alternative embodiment of the article support apparatus of FIG. 1.
FIG. 4 is a fragmentary perspective view of yet another alternative embodiment of the article support apparatus of FIG. 1.

Referring now to FIG. 3 there is shown yet another embodiment of an integral hook assembly for a handle 12. The hook assembly 10 as shown herein comprises first and second hook sections 40 and 41 integrally formed with the top handle bar portion 18. In this configuration of a handle 12 simply facilitates the attachment of articles by the utilization of two integrally molded hook sections formed in a curvilinear configuration.

Referring now to FIG. 4 there is shown yet another alternative embodiment of the hook assembly 10 of the present invention as it is secured to a cross bar 42 of a stroller handle assembly 44. The cross bar 42 is pivotally mounted in the center at a point 45 permitting its pivotal actuation for the collapse of the stroller 44 in a conventional fashion. Arrows 46 illustrate the manner in which the cross bar 42 is permitted to flex about the pivot point 45. Again a pair of hooks 48 and 49 are integrally formed in the cross bar member 42 for facilitating the attachment of loose articles thereto as shown and discussed above.

Figure 5:
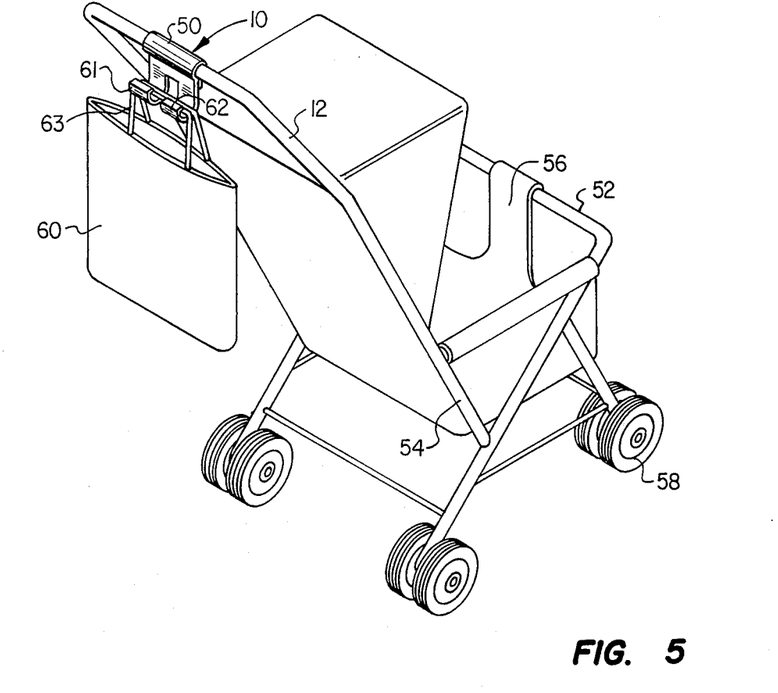
FIG. 5 is a perspective view of an article support assembly secured to a baby stroller illustrating an aspect of the present invention.

Referring now to FIG. 5 there is shown the article support assembly 10 in yet an alternative structural configuration 50. In the support member 50 is fabricated from plastic or the like in a configuration facilitating attachment to the handle 12 of a conventional stroller or the like. A stroller 52 is shown in a perspective view for illustrating the functional use thereof. The handle 12 seen to comprise a portion of the overall stroller frame 54 which supports a stroller seat 56 by a set of wheels 58. A child positioned within the stroller seat 56 may in this way be dealt with while articles such as purses 60 or the like may be hung from the support member 50. A pair of generally C-shaped hook elements 61 and 62 are thereby provided for supporting the handle 63 of the purse. It may be seen that not only a purse 60 but also a sweater (not shown) and/or other flaccid garments such as towels can be carried by the support assembly 50. In this way the portion of the handle 12 adjacent and on either side of the article support member 50 is available for conventional securement by the hands of the user for control of the particular stroller 52.

Figure 6:
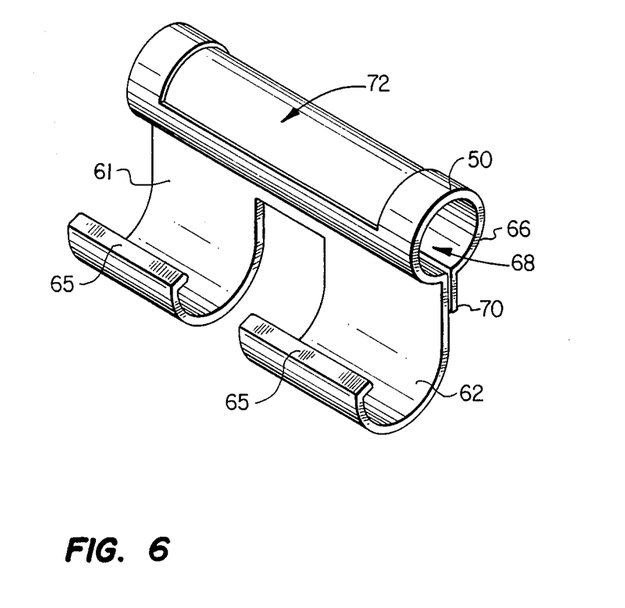
FIG. 6 is an enlarged perspective view of an alternative embodiment of the article support assembly of FIG. 5.
Figure 7:
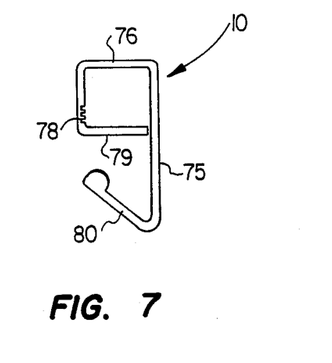
FIGS. 7 through FIGS. 12 are side elevational views of alternative constructional embodiments of the article support assemblies of FIG. 6.

Referring now to FIG. 6 there is shown an enlarged perspective view of the support member of hook 50. In this view, it may be seen that the generally C-shaped hook members 61 and 62 are constructed with a generally flat flange region 65 on the upper portion thereof. A tubular body portion 66 is constructed with a central hollow region 68 formed therethrough. A lower lip 70 depends down from the cylindrical body portion 66 for permitting elasticity and depending engagement after attachment to the handle 12. It may be seen that the plastic flexing action permits attachment to a plurality of handles. A recess area 72 is also provided to enable a label to be affixed therein for identification purposes. This assembly facilitates an easy-on and easy-off, non-permanent, installation for strollers and the like. In this manner the particular hook assembly 10 can be secured to any number of handles 12 including various strollers, carts and buggies.

Figure 8:
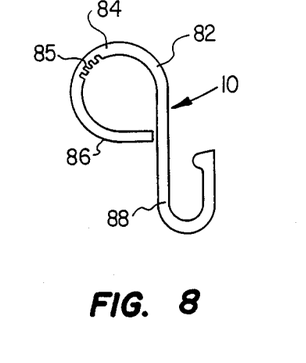

Referring now to FIGS. 7 through 12, a plurality of cross sectional configurations are illustrated for the attachable hook assembly 10. Each hook assembly 10 is provided with its own identification number for purposes of further illustration. For example, FIG. 7 comprises an attachable assembly 75 having a generally rectangular handle engagement portion 76. The handle engagement portion 76 includes a serrated area 78 facilitating the flexibility of the lower member 79 around handle bars and the like. Without such a design sufficient flexibility may not be affordable without breakage. The actual hook region 80 is constructed for easy attachment of any of the plurality of garments or handles. The hook region 80 is seen to be oriented directly beneath the handle section 76 as compared to the generally "FIG. 8" configuration shown in FIG. 8. In FIG. 8 a hook assembly 82 is constructed in a generally "FIG. 8" shape. A handle engagement portion 84 is constructed with serrations 85 facilitating the expansion of the body portion 86 around a handle or the like. A depending body portion 88 is constructed in a generally U-shaped configuration for holding straps and loose articles as defined above.

Figure 9:
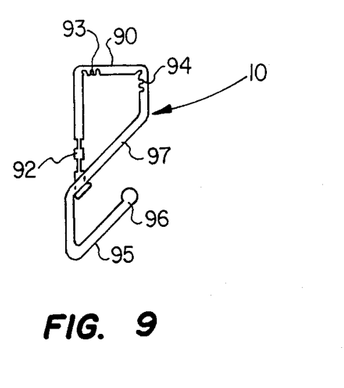

Referring now to FIG. 9 there is shown an adjustable clasp 90 having a snap-down vertical clasp configuration formed by depending section 92. Expansion sections 93 and 94 are likewise constructed therein for purposes of allowing flexibility and the lower hook section 95 is constructed with the lower base member 96 aligned in generally parallel spaced relationship with upper clasp member 97. This is yet another cross sectional configuration comprising an alternative embodiment of the hook 10 of the present invention.

Figure 10:
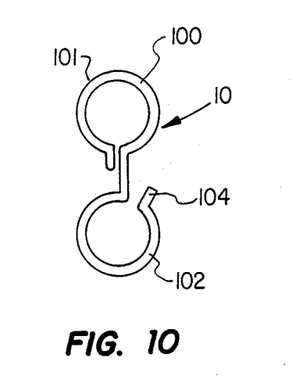
Figure 11:
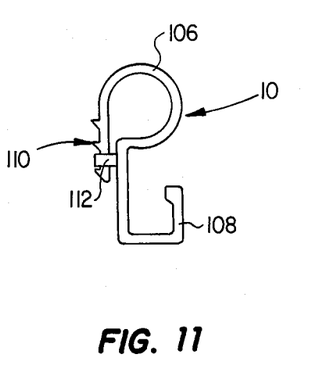
Figure 12:
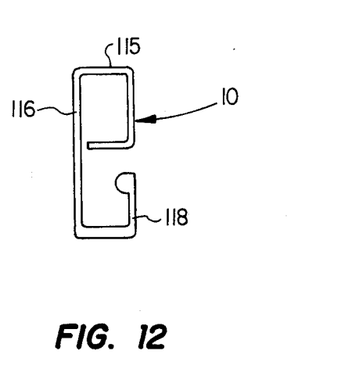

Referring now to FIG. 10 there is shown yet a further symmetrical clasp and hook 10 in a reversible design. The symmetrical clasp 100 shown herein includes an upper cylindrical attachment section 101 and a lower cylindrical hook section 102. The hook section 102 has an outwardly flared flange 104 to permit receipt of articles therein. The reversible hook configuration provides aesthetic symmetry as well as depending structural rigidity for purposes of functional and decorative applications. Likewise, FIG. 11 illustrates a vertical clasp assembly 106 having a lower generally rectangular or U-shaped section 108 for providing a hook region therebeneath. Again the hook region 108 is disposed in alignment with the upper clasp section 106 which may be constructed for adjustable mounting through the serrated portion 110 and fastening section 112. In this manner a number of handle bar configuration sizes and shapes may be secured therewith. FIG. 12 is yet a third version of the symmetrical vertical clasp and hook configuration provided with the hook portion immediately disposed beneath the clasp portion. In this section the rectangular friction clasp 115 includes an upper handle engagement section 116 and lower hook section 118 of generally rectangular design. The overall configuration resembles that of the letter G and provides the general benefits as set forth above.

Figure 13:
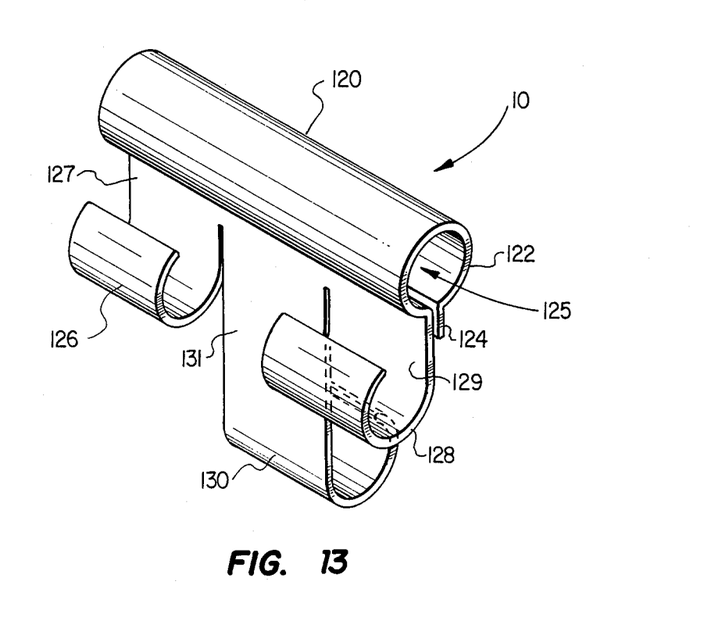
FIG. 13 is an enlarged perspective view of an alternative article support structure of the article support structure of FIG. 6.

Referring now to FIG. 13 there is shown a perspective view of yet another alternative embodiment of the present invention. A hook assembly 120 is shown with a cylindrical handle engaging body portion 122 of the aforedescribed expansion shape. A lower snap flange 124 is constructed for permitting outwardly flaring receipt of a handle section (not shown) through the axial region 125 thereof. Three hooks are herewith provided in an opposed or back-to-back configuration. A first hook 126 depends from the upper cylindrical body portion 122 through a transition region 127. A second hook 128 is disposed in generally parallel spaced relationship to hook 126 and is likewise disposed in a position depending from the upper cylindrical body portion 122 through the transition region 129. Finally, a third hook 130 is disposed in a reverse orientation relative to hooks 126 and 128 while depending from upper cylindrical body section 122 through elongate planer transition region 131. It may be seen that this three hook design in assembly 120 provides a friction clasp assembly facilitating attachment to not only strollers but also grocery and shopping carts and the like. Securement to shopping carts is facilitated by the expansion clasp defined above and the availability of the three hooks 126, 128 and 130 affords ease in application and multiplicity in the number of articles that can be supported therefrom.

Figures 14, 15, 16, 17, 18, 19:
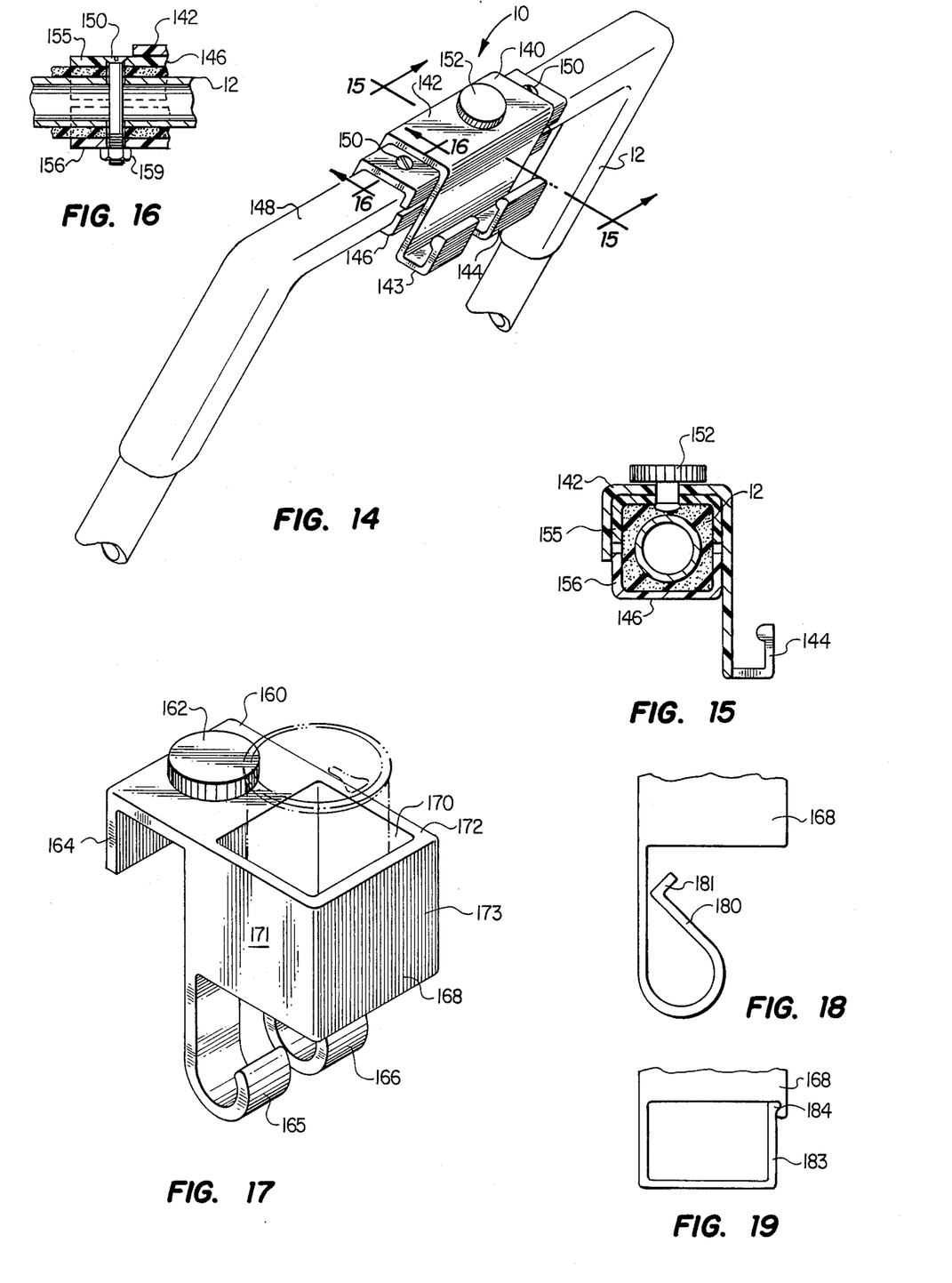
FIG. 14 is a perspective view of an attachable article support fixture illustrating yet another embodiment of the present invention and of the type shown in FIG. 1.
FIG. 15 is an enlarged side elevational cross sectional view of the article support assembly of FIG. 14 taken along lines 15—15 thereof.
FIG. 16 is an enlarged front elevational view of the article support fixture of FIG. 14 taken along lines 16—16 thereof.
FIG. 17 is an enlarged perspective view of an alternative embodiment of an attachable article support fixture of FIG. 14.
FIG. 18 is a fragmentary side elevational view of an alternative embodiment of the article support hook of FIG. 17.
FIG. 19 is a fragmentary side elevational view of an alternative embodiment of the article support hook of FIG. 18.

Referring now to FIG. 14 there is shown an alternative embodiment to the present invention whereby the attachment assembly 10 is provided in a permanently attachable configuration by attachment hook 140. The attachment hook 140 is shown to be constructed with an upper generally rectangular body section 142 and two depending hooks 143 and 144 of generally rectangular design. The design and functionality of these hooks is described in some detail above. What is not described above is the means by which this particular configuration is secured to conventional handles 12 of strollers and the like. The hook assembly 140 is constructed with a mounting brace 146 which clamps around the handle the body portion 148 of the handle 12. A pair of threaded fasteners in the forms of screws 150 are utilized to permanently secure the clasp 146 thereto. A threaded mounting nut 152 is likewise provided for permitting mounting, demounting and interchange of the actual hook member 142. This construction is seen in more detail in FIGS. 15 and 16 where cross sections thereof are illustrated. The clasp 146 is shown to be constructed of two sections 155 and 156 that are threadibly connected to one another around the handle 12. The hook 144 shown depending from the upper hook attachment section 142 which is maintained thereon by rotatable fastener 152. Likewise FIG. 16 illustrates the manner of penetration of the handle 12 by threaded member 150 which utilized a nut 159 on the lower end thereof to secure the lower clamping section 156 to the upper clamping section 155 of the clamping member 146. In this manner the hook 142 can be securably retained thereon.

Referring now to FIG. 17 there is shown yet another embodiment of the present invention for facilitating carrying beverage containers. As shown in FIG. 2 beverage container compartments are disclosed above but not in a permanently attachable configuration. Permanently attachable hook assembly 160 is thus shown with an attachment head 162 extending through an attachment section 164 adapted for engaging in the handle bar region as described above. A pair of hooks 165 and 166 is shown depending beneath a beverage container compartment 168 a adapted for supporting the beverage container 170 shown in phantom herein. A generally rectangular configuration is afforded whereby first and second outer walls 171 and 172 provide a generally parallel spaced relationship which is orthogonal to an inner wall 173. A bottom (not shown) is afforded for supporting the beverage container 170 therein. It may be seen that in this configuration the unit 160 can be attached to the clamping mechanism 146 shown in FIG. 14 above. It is the utilization of the clamping mechanism 146 comprising the upper/lower clamping members 155 and 156, respectively, which affords the ability for the permanent mounting and demounting of these units. Consistent therewith a variation in the configuration of the lower hook elements is also illustrated. In FIG. 18 it may be seen that the lower hook elements 165 and 166 in FIG. 17 are provided in a variation of shape, illustrated as clamp hook 180. Clamp hook 180 has an upper flange 181 facilitating the grasp of the user for the purpose of inserting a garment or the like to be securely held therewithin. The utilization of an open hook such as 165 is not as conducive to securement of flaccid garments such as sweaters and towels due to the fact that without the clamping mechanism clearly shown in the hook 180, such a garment can become easily dislodged. One of the applications for the present invention is the utilization of such a unit 160 on a bicycle or the like whereby the need may often occur for secured support of flaccid garments in conjunction with the holding of a cold drink. FIG. 19 shows yet another embodiment whereby a hook region 183 is shown in a generally rectangular configuration with an upper detent mating section 184 provided. The beverage container section 168 disposed thereabove thus facilitates the overall construction thereof.

Figure 20:
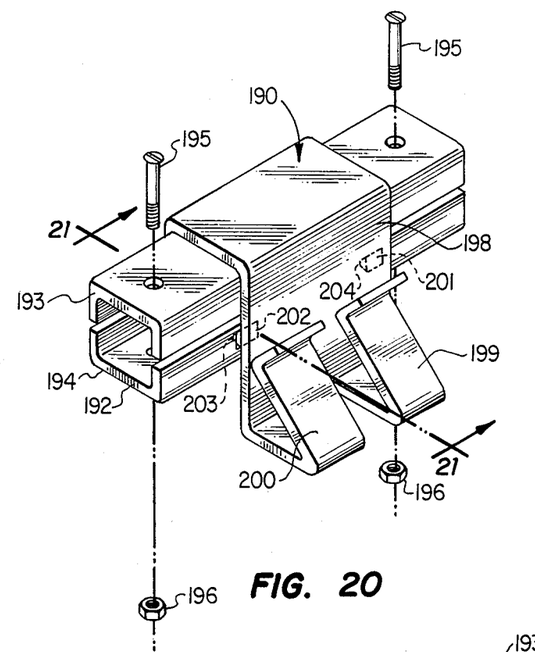
FIG. 20 is a perspective of an alternative embodiment of the attachable support hook assembly of FIG. 14.
Figure 21:
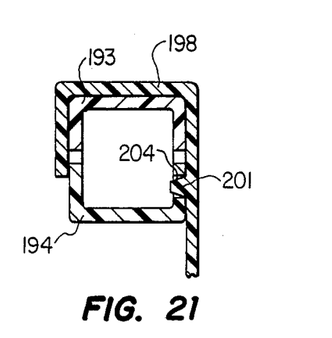
FIG. 21 is a side elevational cross sectional view of the support hook assembly of FIG. 20 taken along the lines 21—21 thereof.

Referring now to FIG. 20 there is shown yet another embodiment of the permanent hook attachment mechanism of FIG. 14. As shown in FIG. 14 the securement clasp 146 comprises upper and lower clamping elements. In the present embodiment the attachment bracket 190 is constructed with a clamping assembly 192 comprising upper and lower, generally U-shaped, clamping members 193 and 194 and clamping members 193 and 194 secured by a pair of conventional threaded fasteners 195 extending therethrough. Nuts 196 are shown therebeneath for purposes of secured engagement. The actual clamping member 190 is constructed of a generally rectangular body section 198 having a pair of depending hook sections 199 and 200. The hook sections 199 and 200 are constructed in a slant configuration adapted for securely retained articles positioned therebehind. The body section 198 is demountably secured to the bracket 192 by a pair of tabs 201 and 202 which are insertable into apertures 203 and 204 formed in the lower bracket section 194. In this manner expansion of the body portion 198 will allow sufficient flexibility to permit the member to be secured to the bracket 192. This assembly is further illustrated in FIG. 21 where the generally rectangular body 198 is illustrated in mating engagement over upper clamping member 193 and lower clamping member 194. The tab 201 is shown inserted into aperture 204 formed in lower bracket 194. It is by the flexibility of this member that sufficient securement force is provided for the securement of articles behind the slanted hooks 199 and 200 described above.

Figure 22:
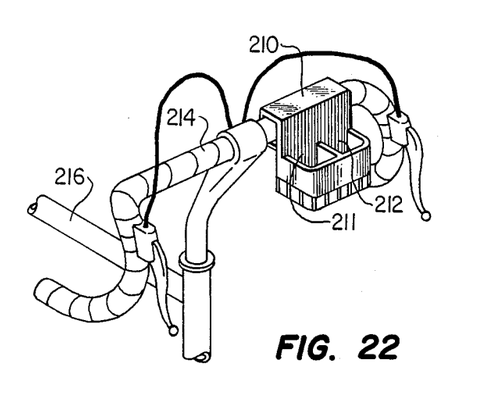
FIG. 22 is a perspective view of an alternative embodiment of the support hook assembly of FIG. 20 mounted to the handle bars of a conventional bicycle.
Figure 23:
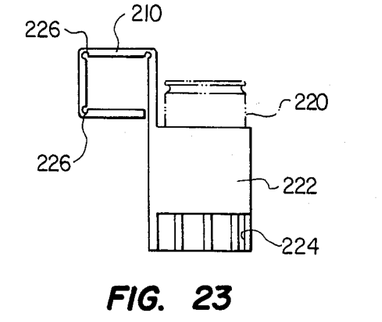
FIG. 23 is an enlarged side elevational view of the support hook assembly of FIG. 22.

Referring now to FIG. 22 there is shown yet a further embodiment of the present invention wherein a beverage container holder 210 is shown with a pair of beverage container sections 211 and 212. This particular assembly is for securement to the handle bars 214 of a conventional bicycle 216 (shown fragmentarily). It may be seen that the attachment of the beverage container holder 210 may be afforded by means of the method and apparatus described above. Likewise FIG. 23 shows one embodiment of such an attachment mechanism whereby the unit 210 supports the beverage container 220 (shown in phantom) in a beverage container section 222 having the lower portion thereof 224 formed in spaced relationship. A series of recesses 226 are provided in the upper rectangular section 210 for purposes of permitting flexibility and expansion for clasping the handle bar 214. Such an expansion is further illustrated in FIG. 24 whereby a series of recesses 228 are shown in a generally cylindrical handle bar engagement section 230 also adapted to a beverage container section 232. In beverage container section 232 a beverage container 234 is shown in phantom. Also shown in phantom is the expanded portion of the cylindrical body region 230 of section 236 whereby the outward flexing thereof to facilitate engagement of the handle bar section 214 is provided. A locking member 238 is likewise included for purposes of securing the engagement around a handle bar or the like.

Figure 24:
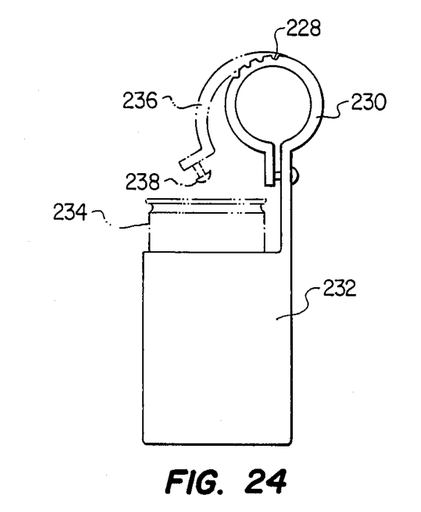
FIG. 24 is a side elevational view of an alternative embodiment of the support hook assembly of FIG. 23.
Figure 25:
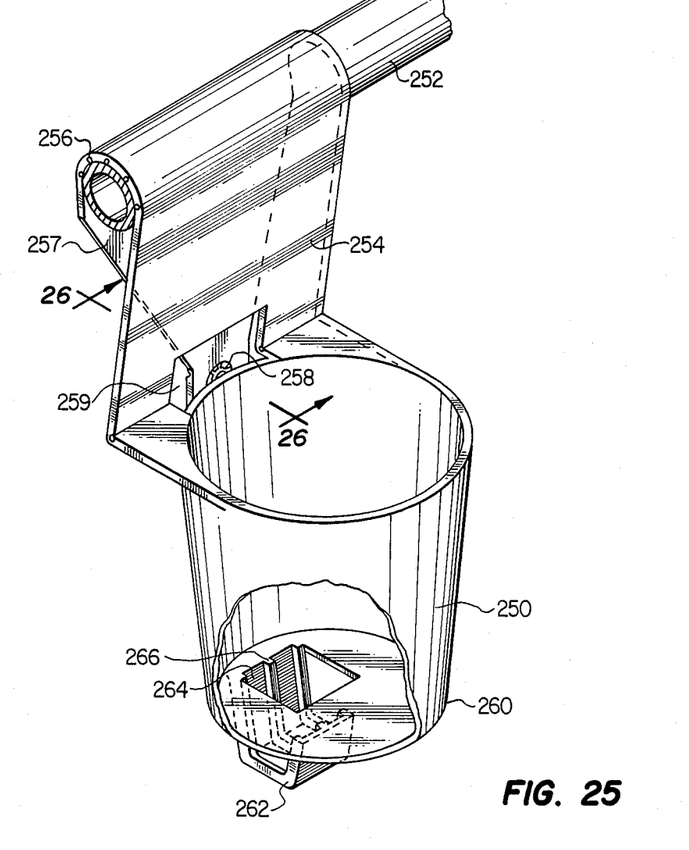
FIG. 25 is a perspective view of an alternative embodiment of a beverage container holder constructed in accordance with the principles of the present invention.

Referring now to FIG. 25 there is shown a perspective view of an alternative embodiment of the beverage container holder of FIG. 24. A tapered beverage container holder 250 is illustrated secured to a cylindrical handlebar 252 of a bicycle, stroller, cart or the like. An attachment region 254 of generally plainer construction is provided in an upstanding configuration adjacent the beverage container section. A plurality of recesses 256 have been constructed in the attachment section 254 to facilitate its engagement and "wrap around" securement to the handlebar 252. In this view a back section 257 of the attachment section 254 permits securement of the said attachment section by a locking member 258. A cut out 259 facilitates the molding of the attachment section 254 adjacent the tpaered walls 260 of the beverage container body portion. It may be seen that the tapered construction of walls 260 facilitate a sufficient draft angle to maximize the simplicity of molding.

Still referring to FIG. 25 the lower body portion thereof is constructed with a hook member 262 adapted for the securement of loose articles as described above. The hook member 262 is formed beneath an aperture 264 formed in the bottom of the beverage container holder. In this configuration injection molding of plastics and the like is greatly facilitated with ribs 266 provided therein for purposes of rigidity and structural reinforcement. It may be seen that the size of the aperture 264 is larger than the lateral width of the top plan of the hook 262 whereby the type of mold may be simplified. The aperture 264 provides not only improved molding techniques but also a drainage aperture for the containment area within tapered walls 260. In this embodiment it may be seen that baby bottles, cold drinks and the like can be conveniently stored during use of the present invention.

Figure 26:
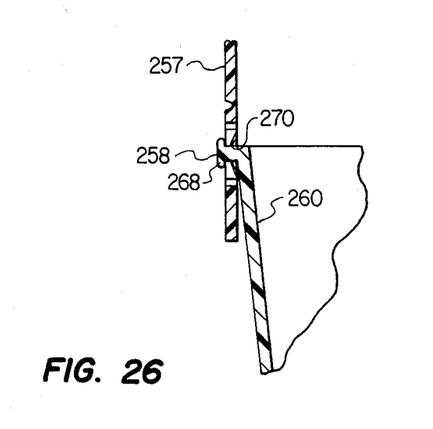
FIG. 26 is an enlarged, fragmentary, side elevational cross-sectional view of a portion of the beverage container holder of FIG. 25 taken along line 26—26 thereof.

Referring now to FIG. 26 there is shown an enlarged side elevational cross-sectional view of the locking mechanism 258 taken along lines 26—26 thereof. In this view it may be seen that the back section 257 of attachment section 254 has been brought into flush engagement with the tapered walls 260 and a locking button 268 extends outwardly therefrom. The locking button 268 has an outwardly flared end which facilitates interlocking engagement with an aperture 270 formed within the back section 257. This "snap" locking is inexpensive to fabricate yet provides sufficient structural attachment integrity to permit efficient utilization of the tapered beverage container assembly 250 of the present invention. It should be noted that other attachment devices are contemplated in accordance with the principles of the present invention.

The present invention thus teaches a plurality of article support devices in the plurality of configurations. In FIGS. 1 through 4 the hook sections 10 are integrally formed with the handle section 12 provide not only a region for supporting loose or flaccid articles and/or straps but also containers directly to strollers, carts and the like. In FIGS. 5 through 13 a flexibly mounting hook assemblage is shown in a myriad of configurations. Each hook is adapted for a particular application and the manner of attachment is described in detail. In FIGS. 16 through 20, both hook and beverage container, permanent attachment configurations are illustrated. These attachment configurations include the utilization of a demountable body portion to a permanent clamping section which affords great versatility as well as utility in the support of both beverage containers and loose articles relative to bicycles, strollers, carts and the like.

Having described the invention in connection with certain specific embodiments thereof, it is to be understood that further modifications may now suggest themselves to those skilled in the art and it is intended to cover such modifications as fall within the scope of the appended claims.

What is claimed is:

1. A support assembly for use with a horizontal bar, handle, or structural member on a mobile ambulation assistance device of the like comprising:
   an integrally formed body portion;
   handle engaging means integral with and extending generally upwardly from said body portion and having means adapted to engage a generally horizontal bar, handle, or structural member portion of a mobile ambulation assistance device, said engaging means further comprising gripping means frictionally engagable with said horizontal bar, handle, or structural member; and
   hook means integral with and extending generally downwardly from said body portion for selective hooking engagement with an article to be supported by said assembly, said hook engaging means comprising at least two hooks facing in opposite directions.

2. A support assembly in accordance with claim 1 in which said horizontal bar, handle, or structural member engaging means are integrally connected to said horizontal bar, handle, or structural member.

3. A support assembly in accordance with claim 1 in which said horizontal bar, handle, or structural member engaging means include threaded fastener means connected to said horizontal bar, handle, or structural member.

4. A support assembly in accordance with claim 1 in which said hook engaging means for support of an article thereon are positioned directly aligned with, and extending downward from, said handle engaging means.

5. A support assembly in accordance with claim 1 in which said hook engaging means for support of an article thereon comprises a clamp hook whereby positive locking engagement of any article thus supported is achieved.

6. A support assembly in accordance with claim 1 in which said hook engaging means for support of an article thereon are positioned directly between said handle engaging means.

7. A support assembly in accordance with claim 1 in which said hook engaging means for support of an article thereon are positioned laterally offset from said handle engaging means.

8. A support assembly in accordance with claim 1 and further comprising beverage container holding means extending generally laterally from said body portion.

9. A support assembly in accordance with claim 8 in which said beverage container holding means comprises generally upright wall means for at least partially surrounding a beverage container.

10. A support assembly in accordance with claim 9 in which said wall means define compartments for a plurality of beverage containers.

* * * * *